United States Patent
Bach

(10) Patent No.: US 9,821,854 B2
(45) Date of Patent: Nov. 21, 2017

(54) SIDE SILL FOR A VEHICLE BODY

(71) Applicant: Honda Motor Co., Ltd., Tokyo (JP)

(72) Inventor: Edward W. Bach, Galloway, OH (US)

(73) Assignee: Honda Motor Co., Ltd., Tokyo (JP)

( * ) Notice: Subject to any disclaimer, the term of this patent is extended or adjusted under 35 U.S.C. 154(b) by 21 days.

(21) Appl. No.: 14/949,989

(22) Filed: Nov. 24, 2015

(65) Prior Publication Data

US 2017/0144706 A1 May 25, 2017

(51) Int. Cl.
*B62D 25/02* (2006.01)
*B62D 21/15* (2006.01)
*B62D 29/00* (2006.01)

(52) U.S. Cl.
CPC ......... *B62D 25/025* (2013.01); *B62D 21/157* (2013.01); *B62D 29/008* (2013.01)

(58) Field of Classification Search
CPC ..... B62D 21/15; B62D 21/025; B62D 21/157
USPC .................................. 296/209, 204, 187.07
See application file for complete search history.

(56) References Cited

U.S. PATENT DOCUMENTS

| | | |
|---|---|---|
| 4,826,238 A | 5/1989 | Misono et al. |
| 4,955,570 A * | 9/1990 | Benz ...................... B21D 47/04 248/300 |
| 5,609,004 A | 3/1997 | Kreis |
| 5,727,826 A | 3/1998 | Frank et al. |
| 6,234,568 B1 * | 5/2001 | Aoki ...................... B62D 21/07 296/203.04 |
| 6,258,465 B1 | 7/2001 | Oka et al. |
| 6,409,257 B1 * | 6/2002 | Takashina ............ B62D 21/157 296/187.12 |
| 6,679,547 B2 * | 1/2004 | Ju-Sik .................... B62D 25/04 296/203.03 |
| 6,854,795 B2 * | 2/2005 | Yamazaki ............ B62D 21/157 296/187.12 |
| 6,896,317 B2 | 5/2005 | Liebhard et al. |
| 7,040,682 B2 * | 5/2006 | Tokumoto ............... B60R 13/04 296/1.08 |
| 7,648,191 B2 | 1/2010 | Sakamoto et al. |
| 8,282,154 B2 * | 10/2012 | Maruyama ............ B62D 25/02 296/193.05 |

(Continued)

FOREIGN PATENT DOCUMENTS

| | | |
|---|---|---|
| DE | 102009044417 | 5/2011 |
| EP | 1702832 | 9/2006 |

(Continued)

*Primary Examiner* — Pinel E Romain
(74) *Attorney, Agent, or Firm* — Rankin, Hill & Clark LLP

(57) ABSTRACT

A vehicle frame structure includes an elongated side sill having an internal space defined by an upper wall, a lower wall, an outer lateral side wall, and an inner lateral side wall. The internal space is partitioned by a vertical rib and a horizontal rib, the perpendicularly crossed vertical and horizontal ribs connecting inside faces of the upper, lower, outer and inner walls. The vertical rib separates the side sill into an outer lateral portion and an inner lateral portion. The outer lateral portion is defined by an outer lateral section of each of the upper and lower wall and the outer side wall. The inner lateral portion is defined by an inner lateral section of each of the upper and lower wall and the inner side wall. The outer lateral portion of the side sill is thicker than the inner lateral portion of the side sill.

19 Claims, 5 Drawing Sheets

(56) References Cited

U.S. PATENT DOCUMENTS

| | | | | |
|---|---|---|---|---|
| 8,308,227 B2* | 11/2012 | Tsuruta | ................ | B62D 21/157 |
| | | | | 296/209 |
| 8,419,110 B2* | 4/2013 | Katz | ................... | B62D 33/046 |
| | | | | 296/186.1 |
| 8,696,051 B2* | 4/2014 | Charbonneau | ....... | B62D 21/157 |
| | | | | 296/187.12 |
| 8,746,786 B2* | 6/2014 | Pohl | ..................... | B62D 25/025 |
| | | | | 296/209 |
| 9,493,190 B1* | 11/2016 | Alwan | ................. | B62D 21/157 |
| 2014/0327274 A1 | 11/2014 | Baldwin | | |
| 2015/0375789 A1* | 12/2015 | Kitakata | .............. | B62D 21/152 |
| | | | | 296/187.1 |
| 2016/0114667 A1* | 4/2016 | Ikeda | ....................... | B60K 1/04 |
| | | | | 180/68.5 |
| 2016/0288735 A1* | 10/2016 | Horner | .................... | B60R 13/04 |

FOREIGN PATENT DOCUMENTS

| | | |
|---|---|---|
| JP | H06142754 | 5/1994 |
| JP | H09226622 | 9/1997 |
| JP | H10316046 | 12/1998 |
| WO | 2005118373 | 12/2005 |

\* cited by examiner

SIDE SILL FOR A VEHICLE BODY

BACKGROUND

On conventional steel white bodies the side sill is formed of outer and inner panels that are welded together and is secured to the surrounding body construction. Stiffeners and reinforcements can be added inside of the side sill for crash specific strength. The side sills are typically made of high strength steel for crash. Aluminum vehicle frames typically apply an extruded section for the side sill, and reinforcements can be added to the extrusion to provide additional strength for performance. The side sill is a critical part for pole impacts and must have sufficient crush and energy absorption to prevent intrusion to the passenger cabin. The side sill also needs to have sufficient torsion performance for structural rigidity of the vehicle and axial crush for front impacts. And because the side sill is the largest part on the vehicle the cross sectional area of the section needs to be reduced as much as possible.

BRIEF DESCRIPTION

According to one aspect, a vehicle frame structure comprises a side sill elongated in a longitudinal direction of a vehicle, the side sill having an internal space defined by an upper wall, a lower wall, an outer lateral side wall, and an inner lateral side wall. The internal space is partitioned by a vertical rib and a horizontal rib, the perpendicularly crossed vertical and horizontal ribs connecting inside faces of the upper, lower, outer and inner walls. The vertical rib separates the side sill into an outer lateral portion and an inner lateral portion. The outer lateral portion is defined by an outer lateral section of each of the upper and lower walls and the outer side wall. The inner lateral portion is defined by an inner lateral section of each of the upper and lower walls and the inner side wall. The outer lateral portion of the side sill is thicker than the inner lateral portion of the side sill.

According to another aspect, a vehicle frame structure comprises a side sill elongated in a longitudinal direction of the vehicle, the side sill having an internal space defined by an upper wall, a lower wall, an outer lateral side wall, and an inner lateral side wall. The internal space is partitioned by a plurality of internal ribs including a vertical rib connecting inside faces of the upper and lower walls, a horizontal rib connecting the vertical rib and the inner side wall, and at least one rib angled relative to the horizontal rib. The side sill further includes at least one angled wall portion extending in a longitudinal direction and connected to the outer side wall. The angled rib spans between an intersection of the vertical and horizontal ribs and an intersection of the outer side wall and angled wall portion.

According to another aspect, a vehicle frame structure comprises a side sill elongated in a longitudinal direction of the vehicle, the side sill having an internal space defined by an upper wall, a lower wall, an outer lateral side wall, and an inner lateral side wall. The internal space is partitioned by a plurality of internal ribs including a vertical rib connecting inside faces of the upper and lower walls and a horizontal rib connecting the vertical rib and at least the inner side wall. The upper wall includes a step portion having an outer vertical wall part located laterally inwardly of the vertical rib. At least one angled wall portion extending in a longitudinal direction is connected to the outer side wall.

DETAILED DESCRIPTION

It should, of course, be understood that the description and drawings herein are merely illustrative and that various modifications and changes can be made in the structures disclosed without departing from the present disclosure. In general, the figures of the exemplary vehicle body side sill are not to scale. As used herein, lateral directions are transverse across the vehicle body, i.e., left and right directions. Likewise, longitudinal directions refer to forward and rearward directions of vehicle travel, and the vertical directions relate to elevation, i.e., upward and downward directions. It will also be appreciated that the various identified components of the exemplary side sill disclosed herein are merely terms of art that may vary from one manufacturer to another and should not be deemed to limit the present disclosure.

Figure 1:
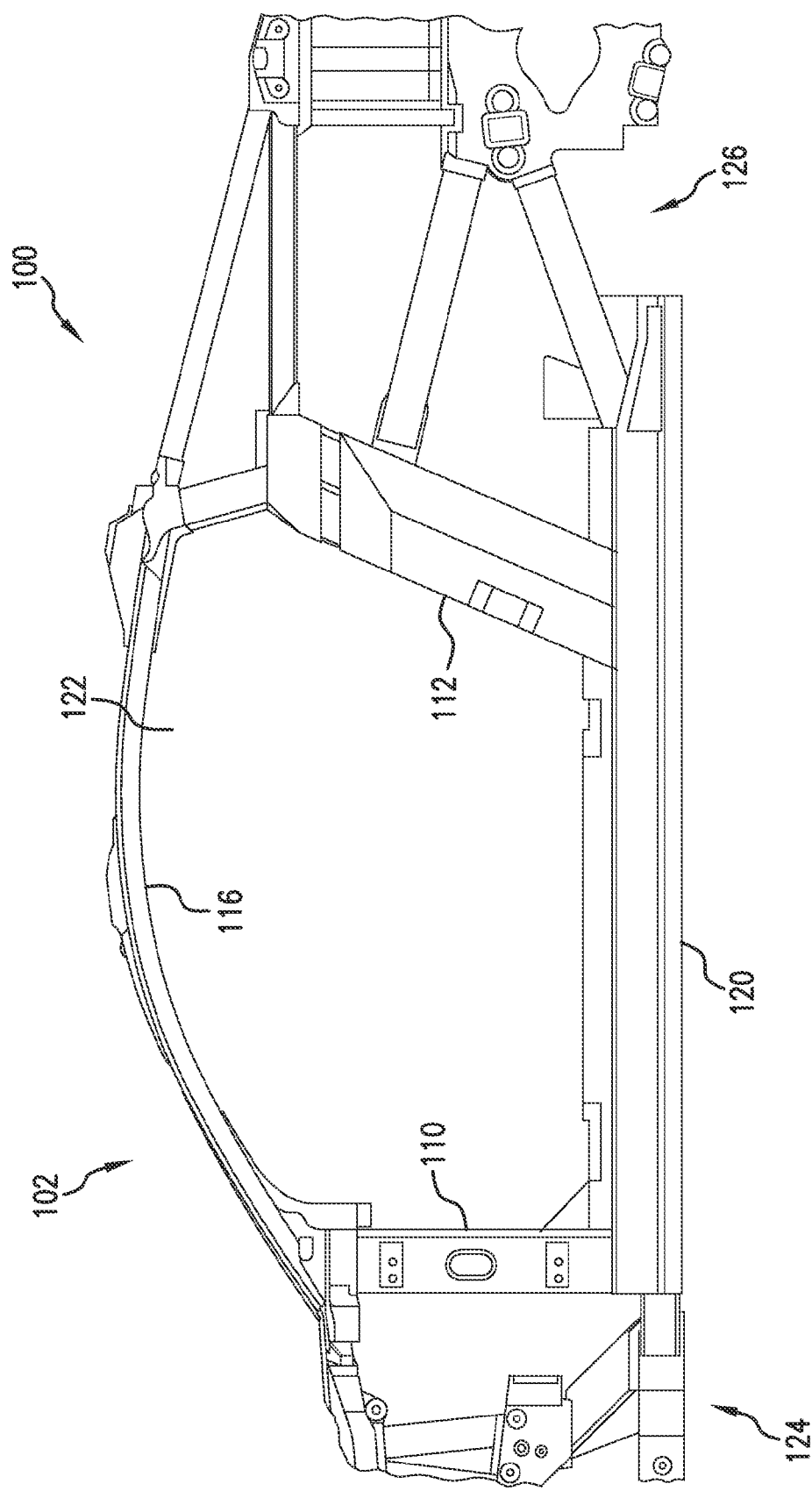
FIG. 1 is a schematic side view of a frame portion of a vehicle body according to the present disclosure.

Referring now to the drawings, wherein like numerals refer to like parts throughout the several views, FIG. 1 schematically illustrates a frame portion of a vehicle body 100 including a side frame structure 102 having a front pillar 110, a center pillar 112 each extending generally in the vertical direction, a longitudinally extending roof side rail 116 located above the pillars 110, 112, and a longitudinally extending side sill 120 located below the pillars 110, 112. These structural elements 110 to 120 define an openings 122 adapted to accommodate a door (not shown). The side frame structure 102 is provided at each of the right and left sides of the vehicle body 100 and may be identically constructed, but for their disposition on opposite sides of the vehicle. Incidentally, the structural elements 110 to 120 of the exemplary side frame structure 102 are constituted by aluminum or aluminum alloy members which are formed by extrusion molding so as the have the necessary sectional shapes respectively, as described below. The vehicle body 100 further includes a front frame structure 124 and a rear frame structure 126 each connected to the side frame structure 102, and a floor panel 128 is interposed between the left and right side sills. The features of the front frame structure 124 and rear frame structure 126 are not germane to the present disclosure and will be omitted for conciseness.

Figure 2:
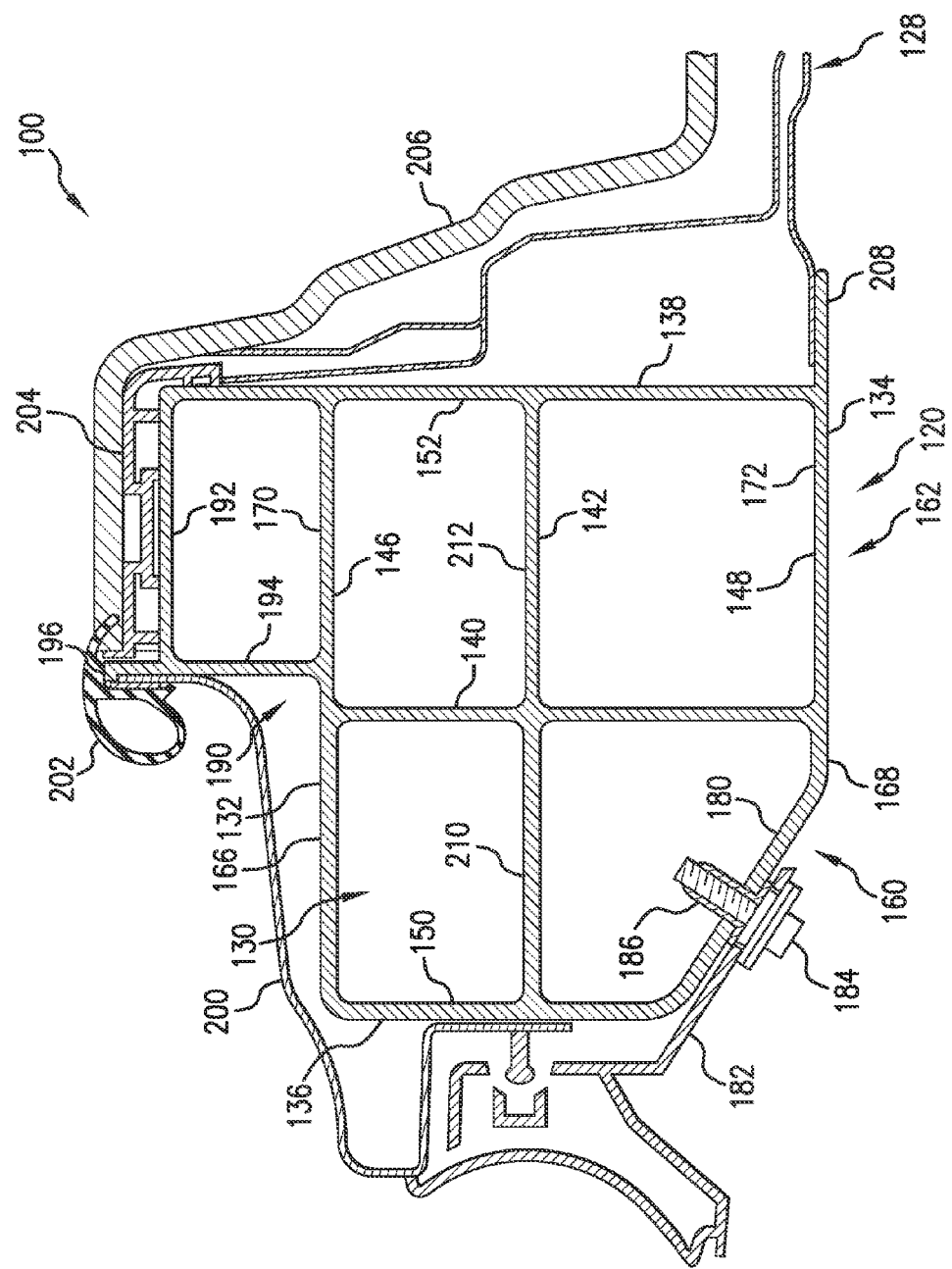
FIG. 2 is a cross-sectional view of a side sill of the vehicle body of FIG. 1 according to one aspect of the present disclosure.

FIG. 2 is a cross-sectional view of the side sill 120 of the vehicle body 100 according to one aspect of the present disclosure. As depicted, the side sill 120 is elongated in the longitudinal direction of the vehicle body 100 and has a hollow generally box-like cross-section having an internal space 130 therein which is defined by an upper wall 132, a lower wall 134, an outer lateral side wall 136, and an inner lateral side wall 138. The side walls 136, 138 are located on, respectively, the left and right sides as viewed in the drawing, i.e., the outer and inner sides with respect to the vehicle body 100. In this sense, the side walls 136, 138 are referred to as the outer lateral side wall and the inner lateral side wall, respectively. The internal space 130 is partitioned by first strengthening rib 140 and a second strengthening rib 142. The first rib 140 is elongated in the longitudinal direction of the vehicle body and is vertically oriented to connect respective inside faces 146, 148 of the upper and lower walls 132, 134. The second rib 142 is elongated in the longitudinal direction of the vehicle body and is horizontally oriented to connect respective inside faces 150, 152 of the outer and inner lateral side walls 136, 138. Accordingly, the perpendicularly crossed vertical and horizontal ribs 140, 142 interconnect the walls of the side sill 120.

The first rib 140 separates the side sill 120 into an outer lateral portion 160 and an inner lateral portion 162. The outer lateral portion 160 is therefore defined by an outer lateral section 166 of the upper wall 132, an outer lateral section 168 of the lower wall 132 and the outer side wall 136. The inner lateral portion 162 is defined by an inner lateral section 170 of the upper wall 132, an inner lateral section 172 of the lower wall 134, and the inner side wall 138. As will be described below, the outer lateral portion 160 of the side sill 120 has an overall thickness greater than the inner lateral portion 162 of the side sill 120.

The side sill 120 further includes an angled wall portion 180 extending in the longitudinal direction of the vehicle body 100 and connecting the lower wall 134 and the outer side wall 136. The angle wall portion 180 defines part of the outer lateral portion 160 of the side sill 120 and defines a mounting location for a side sill garnish 182. As shown, the side sill garnish 182 is attached to the angled wall portion 180 by any common attachment method, such as the depicted fastener 184 which is threadingly received in an opening of a boss 186. The side sill 120 further includes a step portion 190 provided on the inner lateral section 170 of the upper wall 132. The step portion 190 has a hollow generally box-like cross-section and is defined by an upper portion of the inner side wall 138, the inner lateral section 170, an upper horizontal wall part 192, and an outer vertical wall part 194. The outer vertical wall part 194 is located laterally inwardly of the first rib 140 and includes a flange 196 for securing a side panel 200. As shown in FIG. 2, the side panel 200 is further secured to the outer side wall 136 and is connected to the side sill garnish 182. A door seal 202 is mounted on the flange 196 and the side panel 200. The horizontal wall part 192 of the step portion 190 defines a mounting surface for at least one of a step garnish 204 and carpet 206. A flange 208 on the inside of the inner side wall 138 provides a surface for the floor panel 128 to be attached to the side sill 120 using any common attachment method. It should be appreciated that the lower wall 134 provides a jack location for the vehicle.

As indicated previously, the outer lateral portion 160 of the side sill 120 is thicker than the inner lateral portion 162 of the side sill 120. The outer lateral portion 160 is defined by the outer lateral sections 166, 168 of each of the upper and lower walls 132, 134 and the outer side wall 136. The outer lateral portion 160 is further defined by an outer lateral section 210 of the second horizontal rib 142 and the angled wall portion 180. Each of these structural members that together define the outer lateral portion 160 has an increased thickness compared to the inner later portion 162. The inner lateral portion 162 is again defined by the inner lateral sections 170, 172 of each of the upper and lower walls 132, 134, the inner side wall 138, the step portion 190, and an inner lateral section 212 of the horizontal second rib 142. Each of these structural members of the inner lateral portion 162 has a reduced thickness as compared to the outer lateral portion 160. As depicted, the vertical first rib 140 has a thickness approximately equal to the thickness of the structural members that define inner lateral portion 162 of the side sill 120. In the depicted configuration of the side still 120, the perpendicularly crossed vertical and horizontal ribs 140, 142 provide the side sill 120 with rigidity and strength and also provide for a pre-determinant load management caused by a side impact or load to the side sill 120.

Figure 3:
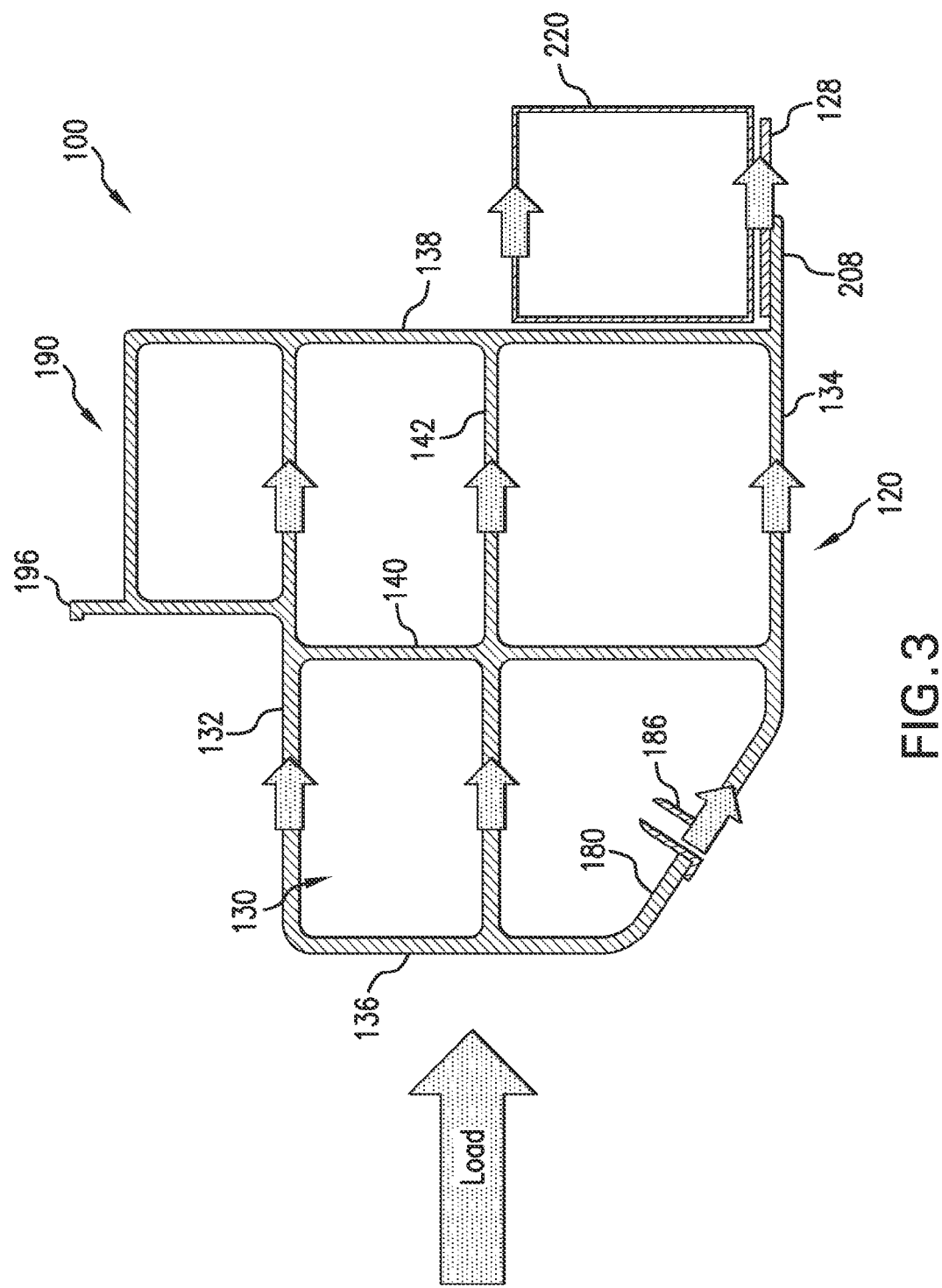
FIG. 3 depicts a force or load distribution of the side sill of FIG. 2.

With reference to FIG. 3, a load distribution caused by a side impact to the outer lateral side wall 136 of the side sill 120 is illustrated. The outer side wall 136 is adapted to distribute the load to the entire section of the side sill 120. Particularly, the applied load is directed through the upper wall 132 toward the inner lateral side wall 138. The load is further directed through the angled wall portion 180 and the lower wall 134 toward the inner side wall 138. The horizontal second rib 142 transfers the load to the inside of the side sill section and into a seat cross member 220 mounted to the floor panel 128. The angled wall portion 180 allows for crush to occur and for load transfer to the rest of the side sill section. The increased thickness of the outer lateral portion 160 of the side still 120 provides for an energy absorption and the first and second ribs 140, 142 stabilize the side sill 120 and separate a crush zone (energy absorption) afforded by the angled wall portion 180. The load is further transferred from the lower wall 134 and the second rib 142 to the inner side wall 138 and into the seat cross member 220. Therefore, the varying thickness of the side sill 120 allows for load to be effectively transferred from the thicker outer lateral portion 160 of the side sill 120 to the thinner inner lateral portion 162.

Accordingly, the exemplary side sill 120 is an aluminum extruded material with a variable thickness. In order to meet predetermined side crash targets the side sill 120 the outer lateral portion 160 of the side sill 120 defines the crush zone (energy absorption), and is thicker than the rest of the side sill section to absorb more energy. The inner later portion 162 of the side sill 120 is the load transfer portion of the section. The angled bottom portion 180 allows load to be transferred into the rest of the side sill section while allowing them to crush. The upper wall 132 and the horizontal second rib 142 are parallel to one another and transfer load from the outer side wall 136 to the vertical first rib 140. The first and second ribs 140, 142 stabilizes the crush zone, and the first rib 140 further stabilizes the entire side sill section and separates the crush zone from the load transfer portion. The inner side wall 138 transfers load into the seat cross member 220.

Figure 4:
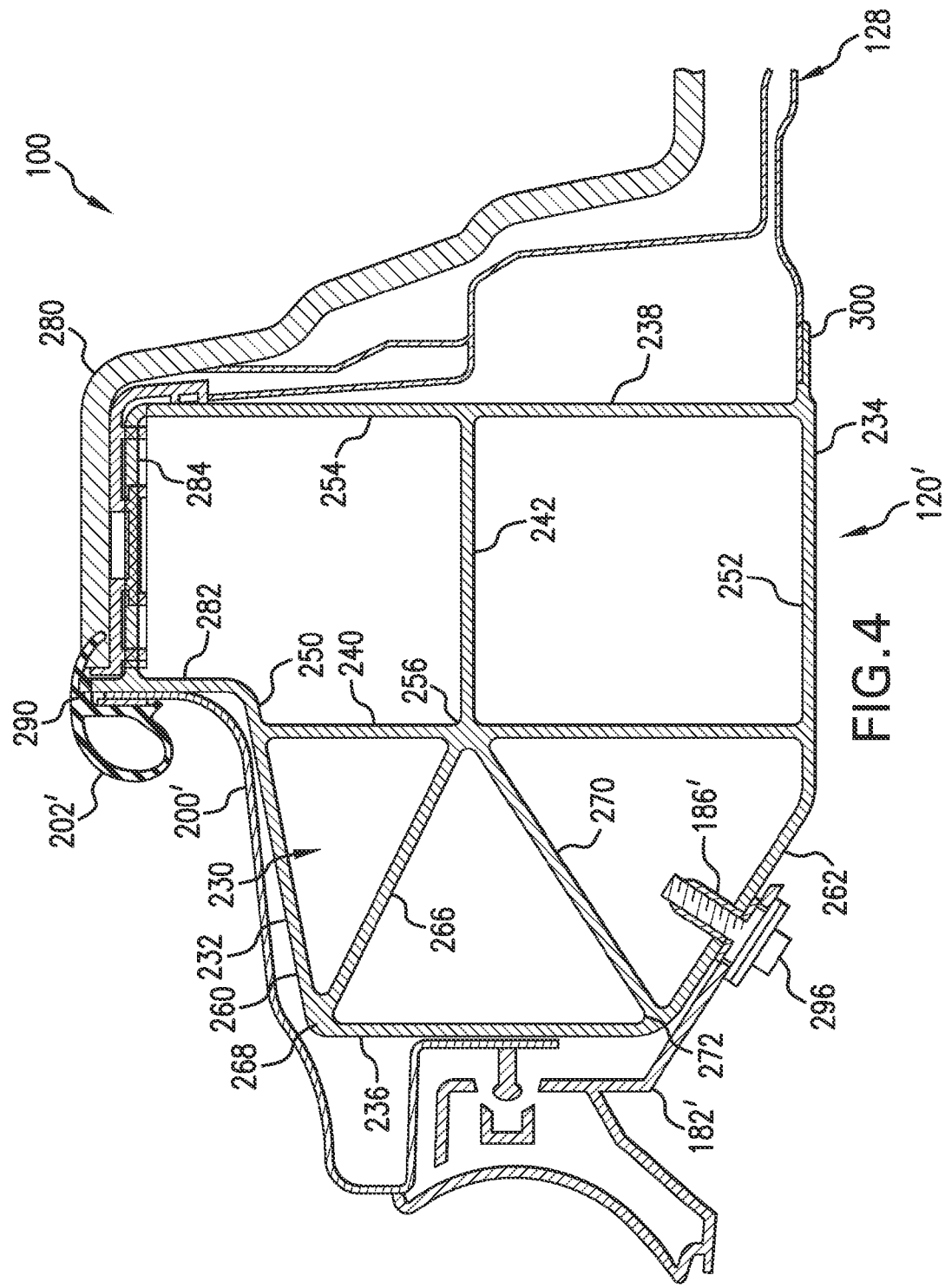
FIG. 4 is a cross-sectional view of a side sill of the vehicle body of FIG. 1 according to another aspect of the present disclosure.

FIG. 4 depicts a cross-sectional view of a side sill 120' of the vehicle body 100 according to another aspect of the present disclosure. Again, the side sill 120' is elongated in the longitudinal direction of the vehicle body 100 and has an internal space 230 defined by an upper wall 232, a lower wall 234, an outer lateral side wall 236, and an inner lateral side wall 238. The internal space 230 is partitioned by a plurality of internal strengthening ribs including a vertically oriented first rib 240 and a horizontally oriented second rib 242. The first rib 240 connects respective inside faces 250, 252 of the upper and lower walls 232, 234. The horizontal second rib 242 connects the vertical rib 240 and an inside face 254 of the inner side wall 238. The plurality of internal ribs further includes at least one internal rib angled relative to the horizontal second rib 242. The side sill 120' includes at least one angled wall portion extending in the longitudinal direction and connected to the outer side wall 236. The at least one angled rib spans between an intersection 256 of the first and second ribs 240, 242 (the intersection 256 defining a node) and an intersection of the outer side wall 236 and the at least one angled wall portion.

More particularly, the side sill 120' includes a first angled wall portion 260 which at least partially defines the upper wall 232 and a second angled wall portion 262, which at least partially defines one of the lower wall 234 and the outer side wall 236. A first angled rib 266 spans between the node 256 and an intersection 268 of the outer side wall 236 and the first angled wall portion 260. A second angled rib 270 spans between the node 256 and an intersection 272 of the outer side wall 236 and the second angled wall portion 262. The exemplary side sill 120' further includes a step portion 280 defined by an outer vertical wall part 282, a horizontal 284, and the inner side wall 238. The outer vertical wall part 282 is located laterally inwardly of the first rib 240 and includes a flange 290 for mounting a side panel 200'. A door sill 202' is mounted to the side panel and the flange 290. A side sill garnish 182' is connected to the side panel 200' and to the second angled wall portion 262 via any common attachment method, such as the depicted fastener 296 which is threadingly received in an opening of a boss 186'. A flange 300 on the inside of the inner side wall 238 provides a surface for the floor panel 128 to be attached to the side sill 120' using any common attachment method. It should be appreciated that the lower wall 234 provides a jack location for the vehicle.

Figure 5:
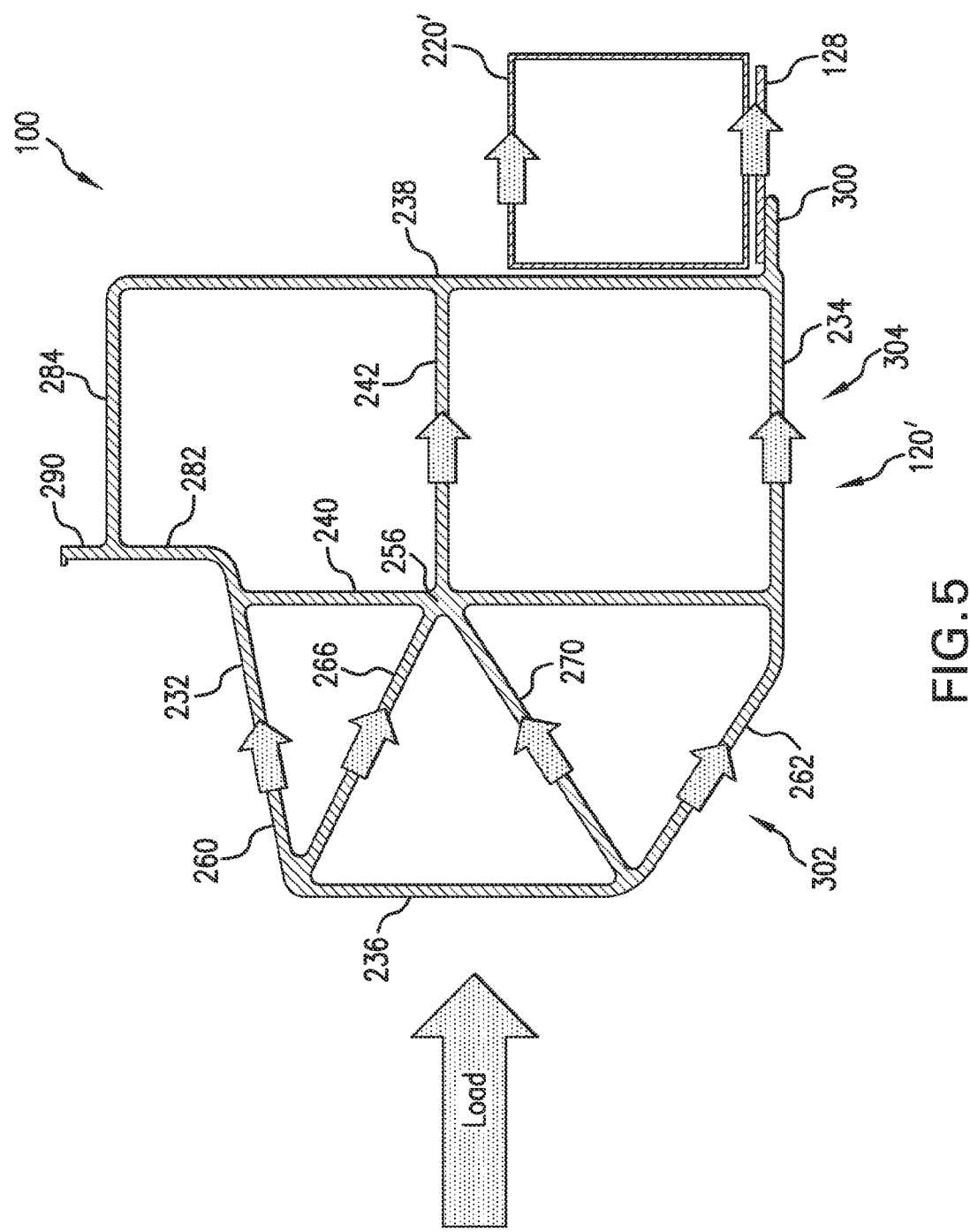
FIG. 5 depicts a force or load distribution of the side sill of FIG. 4.

With reference to FIG. 5, a load distribution caused by a side impact to the outer lateral side wall 236 of the side sill 120' is illustrated. The outer side wall 236 is adapted to distribute the load to the entire section of the side sill 120'. It should be appreciated that the first and second angled wall portions 260, 262 together with the first and second angled ribs 266, 270 define the three distinct crush zones for the side sill 120'. The first angled wall portion 260 of the upper wall 232 allows for crush to occur and for load transfer to the rest of the side sill section. Similarly, the second angled wall portion 262 allows for crush to occur and for load transfer to the rest of the side sill section. The first and second angled ribs 266, 270 distribute load to the node 256 and are adapted to absorb energy. As the load is transferred through the side sill section from the outer side wall 236 to the inner side wall 238, the vertical rib 240 stabilizes the inside half of the side sill section. The load is transferred to the lower wall 234 and the second rib 242 to the inner side wall 238 and the seat cross member 220'.

According, the exemplary side sill 120' is an aluminum extruded member having a constant thickness. An outer lateral portion 302 of the side sill 120' defines a crush zone (energy absorption), and an inner lateral portion 304 of the side sill 120' defines a load transfer portion of the side sill section. The first and second angled wall portions 260, 262 allow load to be transferred into the rest of the side sill section while allowing them to crush. The internal angled ribs 266, 270 stabilize the crush zone. These angled ribs 266, 270 also provide loading in all directions to improve the torsional rigidity of the side sill 120'. It should be appreciated that the angled ribs 266, 270 can be curved towards each other so that the angled ribs 266, 270 when they are being crushed from a side impact will contact each other increasing the energy absorption. The vertical first rib 240 stabilizes the entire side sill section, and separates the crush zone from the load transfer portion. The horizontal second rib 242 stabilizes the inner lateral portion 304 of the side sill section. The second rib 242 is aligned with the first and second angled wall portions 260, 262 to transfer load from the outer side wall 236 to the inner side wall 238, which transfers load into the seat cross member.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A vehicle frame structure comprising:
a side sill elongated in a longitudinal direction of a vehicle, the side sill having an internal space defined by an upper wall, a lower wall, an outer lateral side wall, and an inner lateral side wall, the internal space partitioned by a vertical rib and a horizontal rib, the perpendicularly crossed vertical and horizontal ribs connecting inside faces of the upper, lower, outer and inner walls, the vertical rib separating the side sill into an outer lateral portion and an inner lateral portion, the outer lateral portion defined by an outer lateral section of each of the upper and lower wall and the outer side wall, the inner lateral portion defined by an inner lateral section of each of the upper and lower walls and the inner side wall, the outer lateral portion of the side sill being thicker than the inner lateral portion of the side sill, wherein the inner lateral section of the upper wall includes a step portion, an outer vertical wall part of the step portion being located laterally inwardly of the vertical rib.

2. The frame structure of claim 1, wherein the side sill includes an angled wall portion extending in the longitudinal direction and connecting the lower wall and the outer side wall.

3. The frame structure of claim 2, wherein the angled wall portion defines part of the outer lateral portion of the side sill.

4. The frame structure of claim 2, wherein the angled wall portion defines a mounting location for an associated side sill garnish.

5. The frame structure of claim 1, wherein outer lateral portion of the side sill is further defined by an outer lateral section of the horizontal rib.

6. The frame structure of claim 1, wherein the vertical rib has a thickness approximately equal to a thickness of the inner lateral portion of the side sill.

7. The frame structure of claim 1, wherein the vertical wall part of the step portion includes a flange for attaching an associated side panel, and a horizontal wall part of the step portion defines a mounting surface for one of an associated step garnish and carpet.

8. A vehicle frame structure comprising:
a side sill elongated in a longitudinal direction of the vehicle, the side sill having an internal space defined by an upper wall, a lower wall, an outer lateral side wall, and an inner lateral side wall, the internal space partitioned by a plurality of internal ribs including a vertical rib connecting inside faces of the upper and lower walls and separating the side sill into an outer lateral portion and an inner lateral portion, a horizontal rib located only in the inner lateral portion and having opposite ends connected to the vertical rib and the inner side wall, and at least one rib located only in the outer lateral portion and angled relative to the horizontal rib, the side sill further including at least one angled wall portion extending in the longitudinal direction and connected to the outer side wall, the angled rib spanning between an intersection of the vertical and horizontal ribs and an intersection of the outer side wall and angled wall portion.

9. The frame structure of claim 8, further including a second rib located only in the outer lateral portion and angled relative to the horizontal rib, the side sill further including a second angled wall portion extending in the longitudinal direction and connected to the outer side wall, the second angled rib spanning between the intersection of the vertical and horizontal ribs and an intersection of the outer side wall and second angled wall portion.

10. The frame structure of claim 9, wherein the one angled wall portion forms part of one of the lower wall and the outer side wall and the second angled wall portion forms part of the upper wall.

11. The frame structure of claim 8, wherein the one angled wall portion defines a mounting location for an associated side sill garnish.

12. The frame structure of claim 8, wherein the upper wall includes a step portion, an outer vertical wall part of the step portion being located laterally inwardly of the vertical rib.

13. The frame structure of claim 12, wherein the vertical wall part of the step portion includes a flange for attaching an associated side panel, and a horizontal wall part of the step portion defines a mounting surface for one of an associated step garnish and carpet.

14. The frame structure of claim 8, wherein the horizontal rib and the one angled rib intersect the vertical rib at a common node.

15. A vehicle frame structure comprising:
a side sill elongated in a longitudinal direction of the vehicle, the side sill having an internal space defined by an upper wall, a lower wall, an outer lateral side wall, and an inner lateral side wall, the internal space partitioned by a plurality of internal ribs including a vertical rib connecting inside faces of the upper and lower walls and a horizontal rib connecting the vertical rib and at least the inner side wall, the upper wall including a step portion, an outer vertical wall part of the step portion being located laterally inwardly of the vertical rib, the side sill further including at least one angled wall portion extending in the longitudinal direction and connected to the outer side wall,
wherein the vertical wall part of the step portion includes a flange for attaching an associated side panel, and a horizontal wall part of the step portion defines a mounting surface for one of an associated step garnish and carpet.

16. The frame structure of claim 15, further including a first angled rib aligned with the horizontal rib and connecting to the outer side wall to the vertical rib.

17. The frame structure of claim 16, wherein the first angled rib spans between an intersection of the vertical and horizontal ribs and an intersection of the outer side wall and the angled wall portion.

18. The frame structure of claim 16, wherein the side sill includes a second angled wall portion extending in the longitudinal direction and connected to the outer side wall, and a second angled rib aligned with the horizontal rib and connecting to the outer side wall to the vertical rib, the second angled rib spanning between the intersection of the vertical and horizontal ribs and an intersection of the outer side wall and the second angled wall portion.

19. The frame structure of claim 15, wherein the vertical rib separates the side sill into an outer lateral portion and an inner lateral portion, the outer lateral portion of the side sill being thicker than the inner lateral portion of the side sill.

\* \* \* \* \*